Aug. 16, 1966 C. R. PRATT, JR., ET AL 3,267,342
ELECTRICAL CAPACITOR
Filed May 18, 1965

INVENTORS
Charles R. Pratt, Jr.
Walter H. Tarcza
BY
Walter S. Zabrowski
ATTORNEY United States Patent Office 3,267,342

Patented August 16, 1966

3,267,342

ELECTRICAL CAPACITOR

Charles R. Pratt, Jr., Raleigh, N.C., and Walter H. Tarcza, Painted Post, N.Y., assignors to Corning Glass Works, Corning, N.Y., a corporation of New York Filed May 18, 1965, Ser. No. 456,615
2 Claims. (Cl. 317—258)

This invention relates to electrical capacitors and more particularly to miniature capacitors formed on a substrate such that they may be integrated with a microcircuit, but is in no way limited thereto.

It is an object of the present invention to form an economic, hermetically sealed, non-polar capacitor suitable for integrating into a microcircuit, the components and materials of which capacitor are physically and chemically compatible with each other and the substrate on which the capacitor is formed.

Another object of this invention is to form an electrical capacitor wherein change of capacitance thereof resulting from voltage change is maintained at a minimum.

According to the present invention a microcircuit type capacitor is formed on a non-conductive substrate having a dielectric layer of at least partly crystallized vitreous material sandwiched between and fused to a pair of metallic plates of finely divided metal, and a buffer layer of at least partly crystallized vitreous material having a coefficient of thermal expansion compatible with the dielectric layer fused to the substrate and one of the plates. The capacitor also has a second buffer layer of at least partly crystallized vitreous material fused to the other of the plates and a covering of vitreous glaze material fused to the buffer layer and substrate to hermetically enclose the resulting non-polar capacitor. Capacitor plate terminals extend from the plates to beyond the glaze material.

By compatible coefficient of thermal expansion is meant that the coefficient of expansion of one of the materials involved is the same or sufficiently close to the other material so that the stresses induced in the materials upon cooling, resulting from the difference between the coefficients, is negligible.

By non-polar is meant that the capacitor will have the same capacitance value when the polarity of the electrical energy at the capacitor terminals is reversed.

Additional objects, features, and advantages of the present invention will become apparent to those skilled in the art, from the following detailed description and the attached drawing on which, by way of example, only the preferred embodiment of this invention is illustrated.

Figure 1:
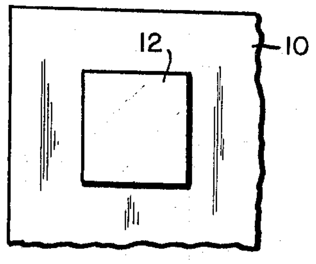
FIGURES 1–6 are fragmentary plan views of various stages of capacitor manufacture illustrating the various steps of the present invention.

Referring now to FIGURE 1, there is shown a flat substrate 10, suitable for forming microcircuits thereon, with a first buffer layer 12 applied to one flat surface thereof. Examples of suitable substrate materials are glass, ceramics, glass-ceramics, glazed ceramics, or the like. Glazed alumina is particularly suitable for this purpose. The buffer layer is formed having an overall shape and size somewhat larger than the size of the ultimate capacitor plates.

Figure 2:
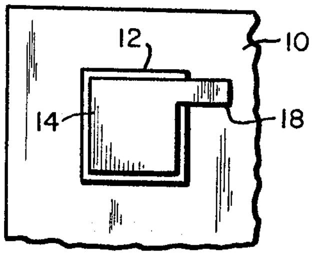

A film of finely divided metal is applied over buffer layer 12 to form first capacitor plate 14, as shown in FIGURE 2. The material of the plate is prepared as a viscous mixture or paste of finely divided metallic powder and an organic vehicle, such as for example, pine oil or oil of lavender.

Figure 3:
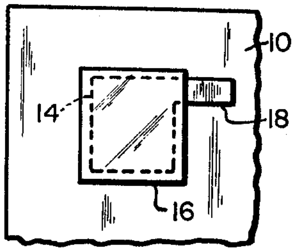

A dielectric layer 16 is applied over plate 14 so that only plate terminal 18 is exposed as shown in FIGURE 3. The material of the dielectric layer is prepared as a viscous mixture or paste of fritted, at least partly crystallizable, vitreous, dielectric material and an organic vehicle, such as for example, pine oil, or oil of lavender. Suitable dielectric materials are illustrated by the compositions of Examples 86 and 88 of co-pending application by A. Herczog and D. Stookey, Serial No. 378,468, filed June 26, 1964, and the compositions shown in Table I herein.

*Table I*

| | 1 | 2 | 3 | 4 | 5 |
|---|---|---|---|---|---|
| BaO | 20 | 18 | 15 | 11 | 39 |
| PbO | 34 | 22 | 21 | 18 | 10 |
| SrO | 3 | 2 | 10 | 9 | ---- |
| $Nb_2O_5$ | 30 | 45 | 40 | 50 | 40 |
| $SiO_2$ | 8 | 7 | 7 | 7 | 5 |
| $Al_2O_3$ | 2 | 4 | 4 | 2 | 2 |
| $B_2O_3$ | 3 | 2 | 3 | 3 | 3 |
| MgO | ---- | ---- | ---- | ---- | 1 |

It is found necessary that buffer layer 12 is formed material having a coefficient of thermal expansion compatible with dielectric layer 16 so that after the unit is subsequently fired, no excessive stresses are induced in the structure whereby the electrical properties of the capacitor are affected or where cracks develop in the structure preventing a hermetically sealed capacitor. For these reasons the same material that is used for the dielectric layer is preferred for the buffer layer 12. The buffer layer, therefore, is also applied as a viscous mixture or paste, and is at least partly crystallizable.

Figure 4:
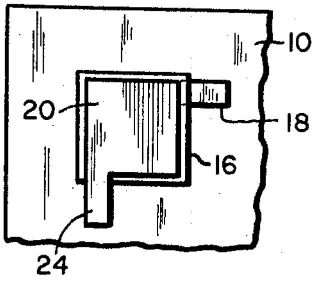

A second capacitor plate 20, as illustrated in FIGURE 4, is applied in the same manner as plate 14. Suitable plate materials are gold, silver, platinum, and palladium. The unit so formed is then fired to volatilize the organic constituents and to at least begin crystallization of the first buffer and dielectric layers.

Figure 5:
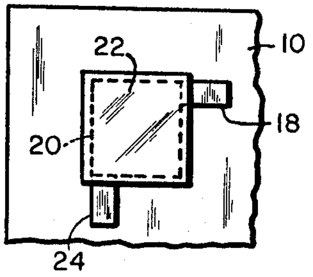
Figure 6:
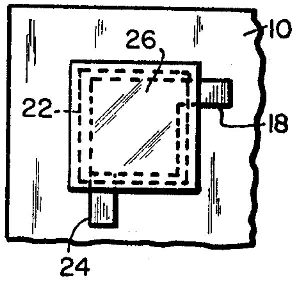

Referring now to FIGURE 5, a second buffer layer 22 is applied over the exposed surface of plate 20 in such a manner that only plate terminals 18 and 24 of plates 14 and 20 respectively are exposed. The second buffer layer is applied to form a transition between the capacitor unit and vitreous glaze 26 illustrated in FIGURE 6. Glaze 26 is applied as a viscous mixture or paste of fritted vitreous material and an organic binder such as pine oil, or oil of lavender, for example. The glaze provides an impervious coating that hermetically seals the capacitor in a manner readily understood by one familiar with the art. Only capacitor plate terminals 18 and 24 extend beyond the glaze. Second buffer layer 22 is formed of material that is at least partly crystallizable and is chemically compatible with both the capacitor plate and glaze materials. The same material used for the buffer layer 12 and dielectric layer 16 is suitable for buffer layer 22. Materials suitable as glaze materials are illustrated in Table II.

*Table II*

| | 1 | 2 |
|---|---|---|
| $SiO_2$ | 30 | 38 |
| $Al_2O_3$ | 10 | 7 |
| $B_2O_3$ | 20 | 20 |
| PbO | 40 | 35 |

The unit is then fired again to volatilize the remaining organic constituents and to complete crystallization of the layers in which crystallization was started by the earlier firing and to crystallize the second buffer layer to the extent that these layers are crystallizable.

As described, the various buffer layers, capacitor plates, dielectric layer, and glaze covering are applied as a viscous mixture or paste. Suitable methods for applying these layers are silk screening, spraying, knife-casting, use of a pressure sensitive tape, or other similar methods well known to one familiar with the art.

It has been found that a buffer layer, between the substrate and the first capacitor plate, formed of material that has a coefficient of thermal expansion compatible with that of the dielectric layer sufficiently reduces the stresses induced in the capacitor unit making it non-polar and reduces the sensitivity of the capacitance thereof upon voltage change. By applying a buffer layer between the second capacitor plate and the glaze material of material that is at least partly crystallizable and otherwise chemically compatible with both the plate and glaze materials, results in a capacitor having electrically sound capacitor plates. If a glaze were applied directly to the metallic capacitor plate, the glaze would be molten during firing causing the plate metal to go into solution, be floated, or otherwise combine with the glaze material resulting in a defective capacitor having a wholly unpredictable capacitance. By employing a buffer material that is crystallizable, the buffer layer is molten for a very short period of time thereby reducing the time during which the metal may go into solution, be floated, or otherwise combine with the adjoining materials.

In addition, it has been found that by firing the unit after the second plate is applied not only permits the organic constituents of the earlier applied layers to be volatilized more readily, but also permits the plates to be fused to the first buffer layer and to the dielectric, and the plate terminals to be fused to the substrate before the second buffer layer and glaze material are applied, thereby still further reducing the possibility of the plate and terminal materials to be floated.

Figure 7:
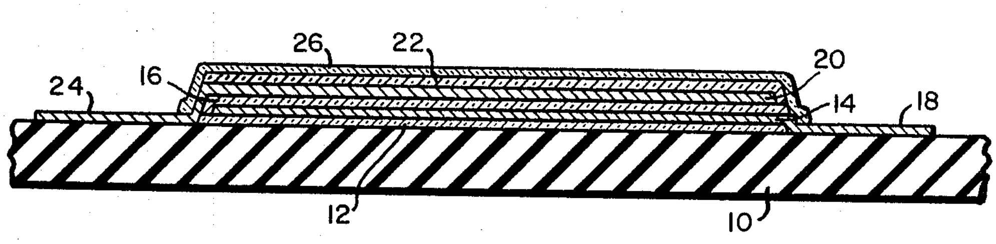
FIGURE 7 is a cross-sectional elevation of a capacitor formed in accordance with this invention.

FIGURE 7 illustrates a hermetically sealed, non-polar capacitor formed in accordance with the present invention and one which is suitable for integrating into a microcircuit. Only the capacitor terminals extend beyond the glaze material.

A typical example of the present invention is illustrated by the following. A glazed alumina substrate having a thickness of about 0.030 inch suitable for forming a microcircuit thereon was provided. A first viscous mixture or paste was prepared by mixing 70% by weight of finely divided crystallizable glass of the type shown in Example 1 of Table I hereof, having a size of up to about 10 microns (1 micron equals 0.001 mm.) and 30% by weight of pine oil vehicle to moisten the glass particles for silk screening. The capacitor plate material was prepared by mixing about 70% by weight of finely divided gold having a size of about 1 micron or less with about 30% by weight of pine oil vehicle to form a second viscous mixture. The glaze coating mixture was prepared by mixing 70% by weight of glass particles of the type shown in Example 1 of Table II hereof, having a size which will pass through a 100 mesh screen, and 30% by weight of pine oil to form a third viscous mixture.

A first buffer layer of the first viscous mixture was silk screened through a 152 mesh screen onto the alumina substrate with the layer having a size somewhat larger than that of the ultimate capacitor plates. A first capacitor plate of the second viscous mixture was then silk screened through a 380 mesh screen over the buffer layer so that only a terminal for the plate extended beyond the buffer layer. A dielectric layer of the first viscous mixture was then silk screened through the 152 mesh screen over the plate covering all of it but the terminal, followed by a second capacitor plate which was silk screened through the 380 mesh screen over the dielectric layer. Only the terminals of the two plates extended beyond the dielectric layer.

The unit so formed was placed in a furnace and fired for 3½ minutes at 925° C. to volatilize the organic constituents and to at least begin crystallization of the buffer and dielectric layers. After the article was cooled a second buffer layer was applied over the exposed surface of the second capacitor plate. This layer was of the same material and was applied in the same manner as the first buffer layer. A coating of the prepared glaze material was then silk screened through a 83 mesh screen over the entire unit permitting only the capacitor plate terminals to extend beyond. The article was then fired for 12 minutes at 925° C. to volatilize the organic constituents of the last layers applied and to complete the crystallization of the first buffer and dielectric layers and to crystallize the second buffer layer to the extent that these layers were crystallizable. The glass coating fused forming a hermetically sealed capacitor. The fired article had a buffer layer between the first capacitor plate and the substrate of approximately 0.0005 inch thick and a coefficient of thermal expansion of approximately $80 \times 10^{-7}$ per ° C. which precisely matched the coefficient of thermal expansion of the dielectric layer which had a thickness of about 0.001 inch. The capacitance value of the resulting capacitor was about 100 pf. It was found that the capacitance value was independent of the polarity of the electrical energy applied to the capacitor terminals and the sensitivity of the capacitance upon voltage change was low.

Although the present invention has been described with respect to specific details of certain embodiments thereof, it is not intended that such details be limitations upon the scope of the invention except insofar as set forth in the following claims.

We claim:

1. An electrical capacitor comprising
a non-conductive substrate,
a first buffer layer of at least partly crystallized vitreous material fused to said substrate,
a first metallic capacitor plate formed of finely divided metal, said first buffer layer being fused to said first capacitor plate,
a dielectric layer of at least partly crystallized vitreous material fused to said first capacitor plate so that a portion of said plate extends beyond an edge of said dielectric layer to form a terminal for said plate, the buffer layer material having a coefficient of thermal expansion compatible with that of the dielectric layer material,
a second metallic capacitor plate formed of finely divided metal so that a portion thereof extends beyond an edge of the dielectric layer to form a terminal for the second plate, said dielectric layer being fused to said second capacitor plate,
a second buffer layer of at least partly crystallized vitreous material fused to said second capacitor plate, and
a layer of vitreous glazing material fused to said second buffer layer and to said substrate to hermetically enclose the capacitor unit so formed, the terminals of said plates extending beyond the glazing material layer.

2. An electrical capacitor comprising
an alumina substrate,
a pair of metallic plates of finely divided metal selected from the group consisting of gold, silver, platinum, and palladium,
a dielectric layer of at least partly crystallized vitreous material sandwiched between said plates and fused thereto, a first buffer layer of at least partly crystallized vitreous material having a coefficient of thermal expansion compatible with said dielectric layer fused to said substrate and one of said plates, a second buffer layer of at least partly crystallized vitreous material fused to the other of said plates, and a layer of vitreous glazing material fused to said second buffer layer and to said substrate to hermetically enclose the capacitor unit so formed, a portion of each of said plates extending beyond the glazing material layer to form terminals for said plates.

References Cited by the Examiner

UNITED STATES PATENTS

| | | | |
|---|---|---|---|
| 2,398,176 | 4/1946 | Deyrup | 317—261 X |
| 3,020,456 | 2/1962 | Layton | 317—261 X |
| 3,075,860 | 1/1963 | Veres | 117—217 X |
| 3,094,650 | 6/1963 | Riegert | 317—258 |
| 3,200,326 | 8/1965 | Pritikin | 317—261 X |

LARAMIE E. ASKIN, *Primary Examiner.*

ROBERT K. SCHAEFER, *Examiner.*

E. GOLDBERG, *Assistant Examiner.*